J. W. ESTES.
ECCENTRICALLY MOUNTED BEARING FOR STUB AXLES.
APPLICATION FILED DEC. 6, 1910.
996,473.
Patented June 27, 1911.
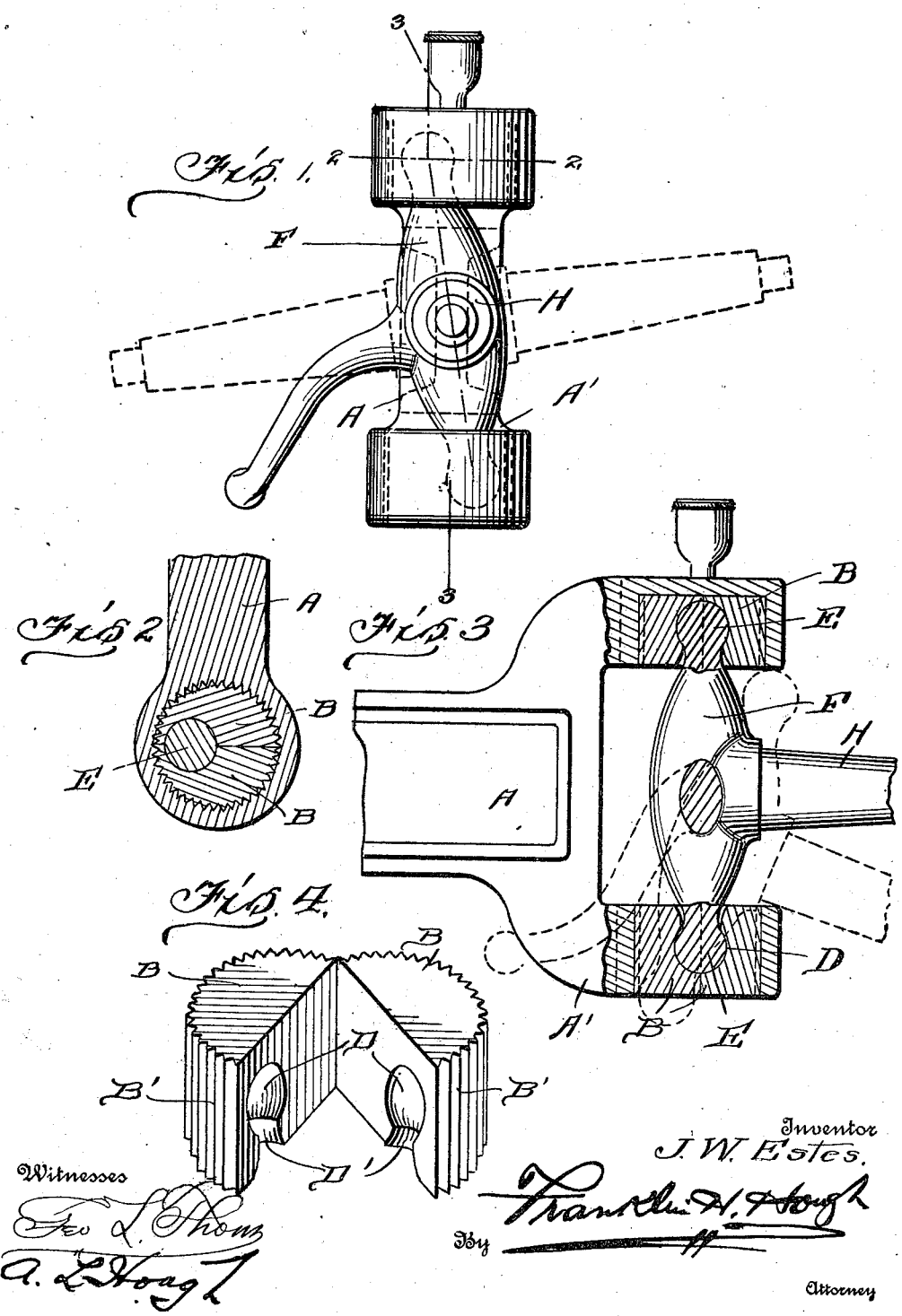

UNITED STATES PATENT OFFICE.

JOHN W. ESTES, OF HOT SPRINGS, ARKANSAS.

ECCENTRICALLY-MOUNTED BEARING FOR STUB-AXLES.

996,473.

Specification of Letters Patent. Patented June 27, 1911.

Application filed December 6, 1910. Serial No. 595,866.

*To all whom it may concern:*

Be it known that I, JOHN W. ESTES, a citizen of the United States, residing at Hot Springs, in the county of Garland and State of Arkansas, have invented certain new and useful Improvements in Eccentrically-Mounted Bearings for Stub-Axles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in stub axles for automobiles, etc., and comprises means whereby the wheel of the vehicle may be turned at angles to a vertical plane when turning corners, whereby the front wheels of a vehicle equipped with my invention may be braced against the momentum of the rapidly moving wheels.

The invention comprises various details of construction and combinations and arrangements of parts which will be hereinafter fully described and then specifically defined in the appended claim.

I illustrate my invention in the accompanying drawings, in which:—

Figure 1 is an end view of a stub axle mounted in accordance with my invention. Fig. 2 is a sectional view on line 2—2 of Fig. 1. Fig. 3 is a sectional view on line 3—3 of Fig. 1, and Fig. 4 is a detail perspective view.

Reference now being had to the details of the drawings by letter, A designates the forward axle of a vehicle having forked ends forming the two arms A', each of which is recessed out upon its inner face to receive the sectional bearing blocks B which have serrations B' about their circumferences adapted to engage similar serrations formed in the marginal wall of the recesses in said arms. Each of said blocks B has a semicircular socket portion D with an opening D' leading therein and said socket members are eccentrically formed with reference to the blocks and together, when the flat faces of the blocks are in contact, form a spherical outline bearing for the rounded end E of the cross-piece F of the stub axle. Each end of the cross-piece is similarly mounted in a socket, the sockets in the two arms being arranged one above the other in the manner shown in Fig. 1 of the drawings whereby, when the arm N fastened to the stub shaft is swung in one direction or the other, the wheel, which is adapted to be mounted upon the bearing surface H of the axle, may swing at an inclination, thereby causing the wheel mounted upon the axle to tilt at an inclination when the vehicle turns in one direction or the other.

By the provision of an eccentrically mounted device as shown, the rounded or ball ends of the cross-piece, when they become worn, may be bushed with little trouble or expense and at the same time, when the other end of the stub axle is moved forward or backward, it will work freely, thus correcting the play or position of the wheel. By positioning the upper end of the cross-piece backward and the lower end forward when the vehicle is turning fast, and when it is desired, the front wheels will brace against the momentum of the car, thus relieving the tire of the strain and wear usually coming upon the wheel when held in a vertical plane and while the vehicle is being turned when rapidly in motion.

What I claim to be new is:—

A stub axle for automobiles, etc., comprising a stationary axle section with a forked end, one arm of which is provided with a cylindrically outlined recess with a serrated wall and the other arm provided with a similarly formed cylindrically outlined opening, semi-cylindrical bearing members with serrated circumferences engaging said recess and semi-cylindrical bearing members with serrated circumferences engaging said opening, the inner face of each semi-cylindrical bearing section having a semi-spherical recess forming a bearing, a spindle section having a cross-piece at one end provided with cylindrical bearing ends engaging said recesses, said recesses in the two bearing members being eccentrically formed.

In testimony whereof I hereunto affix my signature in the presence of two witnesses.

JOHN W. ESTES.

Witnesses:
JESSE BOUTWELL,
E. V. VISORT.

---

Copies of this patent may be obtained for five cents each, by addressing the "Commissioner of Patents, Washington, D. C."